United States Patent
Chung et al.

(10) Patent No.: US 9,563,442 B2
(45) Date of Patent: Feb. 7, 2017

(54) BASEBOARD MANAGEMENT CONTROLLER AND METHOD OF LOADING FIRMWARE

(71) Applicant: International Business Machines Corporation, Armonk, NY (US)

(72) Inventors: Chun-Hung Chung, New Taipei (TW); Ku-Chang Kuo, Taipei (TW); Bill K. P. Lam, Taipei (TW); Yi-Hsi Wang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/729,106

(22) Filed: Jun. 3, 2015

(65) Prior Publication Data

US 2015/0261546 A1 Sep. 17, 2015

Related U.S. Application Data

(63) Continuation of application No. 14/521,973, filed on Oct. 23, 2014.

(30) Foreign Application Priority Data

Dec. 31, 2013 (TW) .............................. 102149353 A

(51) Int. Cl.
G06F 12/02 (2006.01)
G06F 9/44 (2006.01)
(52) U.S. Cl.
CPC .......... *G06F 9/4406* (2013.01); *G06F 9/4408* (2013.01); *G06F 9/4411* (2013.01)

(58) Field of Classification Search
CPC ... G06F 12/0246; G06F 9/4408; G06F 9/4406
USPC .................................................. 711/103, 115
See application file for complete search history.

(56) References Cited

U.S. PATENT DOCUMENTS

| 6,965,989 B1 * | 11/2005 | Strange ..................... G06F 1/24 709/220 |
| 7,055,148 B2 | 5/2006 | Marsh et al. |
| 7,562,208 B1 * | 7/2009 | Reed .................... G06F 11/1433 710/260 |
| 7,797,693 B1 | 9/2010 | Gustafson et al. |
| 8,046,753 B1 | 10/2011 | Qumei |

(Continued)

FOREIGN PATENT DOCUMENTS

| CN | 102073514 A | 5/2011 |
| CN | 102855146 A | 1/2013 |
| CN | 103365667 A | 10/2013 |

OTHER PUBLICATIONS

Kushwaha, "A Trusted Bootstrapping Scheme Using USB Key Based on UEFI", International Journal of Computer and Communication Engineering, Sep. 2013, pp. 543-546, vol. 2, No. 5 DOI: 543 10.7763/IJCCE.2013.V2.245.

(Continued)

*Primary Examiner* — Pierre-Michel Bataille
(74) *Attorney, Agent, or Firm* — Joseph W. Cruz

(57) ABSTRACT

Disclosed is a baseboard management controller (BMC) that may include a bootloader, and an interface to a removable storage device having a first firmware file. The bootloader may be configured to load the first firmware file from the removable storage device for the BMC to run a kernel.

6 Claims, 3 Drawing Sheets

(56) References Cited

U.S. PATENT DOCUMENTS

| | | | |
|---|---|---|---|
| 8,990,140 B2 * | 3/2015 | Michelstein | G06F 17/211 705/1.1 |
| 2007/0244941 A1 * | 10/2007 | Reed | G06F 11/1433 |
| 2009/0271780 A1 * | 10/2009 | B | G06F 8/65 711/171 |
| 2010/0011375 A1 * | 1/2010 | Kivinen | G06F 21/53 719/313 |
| 2011/0087920 A1 * | 4/2011 | Hendricks | G06F 21/554 714/21 |
| 2011/0112819 A1 * | 5/2011 | Shirai | G06F 9/4445 703/21 |
| 2011/0179211 A1 | 7/2011 | Li et al. | |
| 2012/0117625 A1 * | 5/2012 | Ray | H04L 9/3247 726/4 |
| 2013/0013905 A1 | 1/2013 | Held et al. | |
| 2013/0125107 A1 | 5/2013 | Bandakka et al. | |
| 2014/0372743 A1 * | 12/2014 | Rogers | H04L 9/3234 713/2 |
| 2015/0234650 A1 | 8/2015 | Kim et al. | |
| 2015/0277774 A1 * | 10/2015 | Lei | G06F 13/14 713/2 |
| 2015/0332050 A1 * | 11/2015 | Garces-Erice | G06F 9/441 713/2 |

OTHER PUBLICATIONS

Zhou et al., "Advance and Development of Computer Firmware Security Research", Proceedings of the 2009 International Symposium on Information Processing (ISIP'09), Aug. 2009, pp. 258-262, © 2009 Academy Publisher, AP-PROC-CS-09CN002.

TW Application 102149353, entitled "Baseboard Management Controller and Method of Loading Firmware Thereof," filed on Dec. 31, 2013, 16 pages.

Chung et al., "Baseboard Management Controller and Method of Loading Firmware," U.S. Appl. No. 14/521,973, filed Oct. 23, 2014.

List of IBM Patents or Patent Applications Treated as Related.

* cited by examiner

BASEBOARD MANAGEMENT CONTROLLER AND METHOD OF LOADING FIRMWARE This application is based on and claims the benefit of priority from Taiwan Patent Application 102149353, filed on Dec. 31, 2013.

BACKGROUND

The present disclosure relates to a baseboard management controller ("BMC") and a method of loading firmware by the BMC, and more particularly, to a BMC and a method of loading firmware by the BMC when a computer host has not yet been booted up.

Firmware in a BMC or in an operating system firmware interface can become corrupt due to the problems that occur during the writing process of firmware. In addition, firmware may need to be updated from time to time, particularly when the computer system is at the development and testing stages. The original firmware may fail once other hardware components are changed or modified.

SUMMARY

According to various embodiments of the present disclosure, a BMC is provided, which may include a bootloader and an interface to a removable storage device. The removable storage device may have a pre-stored first firmware file and a kernel. The bootloader may be configured to load the kernel from the removable storage device and run the kernel. The kernel may be configured to copy the first firmware file from the removable storage device.

When a computer system is at the development and testing stages, if firmware in the BMC or operating system firmware interface on a motherboard are corrupt, a solution is to return the entire motherboard to the manufacturer for replacement. Also, firmware updates can occur by accessing firmware files from storage devices through a south bridge chip, which is not feasible if the computer system is still at the development and testing stages, or when the computer system simply cannot be booted up at all. Further, updating firmware via trivial file transfer protocol (TFTP) requires the knowledge of additional and complicated network settings. A general computer system developer may not have knowledge of these settings and may need other specialists for help, which may add up cost and waste time.

By contrast, an embodiment of the present disclosure may allow a computer system developer to conduct firmware updates with a removable storage device, such as a portable and cheap USB disk dongle. A complete and non-damaged version (or a latest version) of firmware files may be stored in the removable storage device. When original firmware in the BMC or the operating system firmware interface on the motherboard are corrupt or need updates, one can just connect the removable storage device to the BMC through an appropriate interface, and the BMC can directly load and run a kernel from the removable storage device. Then the kernel may automatically copy firmware files as needed to replace the original firmware files in the BMC or in the operating system firmware interface.

The process discussed above may work if the BMC is powered. Further, by saving the intervention by the south bridge chip, the process can also work when the computer system has not been booted yet (or cannot be booted up). In addition, the process just described requires neither network support nor additional settings. Moreover, when the removable storage device is used with a motherboard, the removable storage device can be removed and applied to another motherboard, as opposed to disposing backup mechanisms on each motherboard. This can reduce the manufacturing cost compared with other approaches.

In an embodiment, the BMC may include a bootloader and an interface to a removable storage device. The removable storage device may have a pre-stored first firmware file and a kernel. And the bootloader may be configured to load the kernel from the removable storage device. The kernel may be configured to copy the first firmware file from the removable storage device to a first non-volatile memory.

In another embodiment, disclosed is a computer system including the BMC discussed above.

In yet another embodiment, disclosed is a method of firmware loading, applied to the BMC mentioned above, which includes connecting a removable storage device to an interface, wherein the removable storage device has a first firmware file, a second firmware file, and a kernel pre-stored thereon. A bootloader may load the kernel from the removable storage device. Moreover, the method may include copying another firmware file from the removable storage device to an operating system firmware interface, which is connected to the BMC.

Reference throughout this specification to features, advantages, or similar language does not imply that all of the features and advantages of the present disclosure should be or are in any single embodiment. Rather, language referring to the features and advantages is understood to mean that a specific feature, advantage, or characteristic described in connection with an embodiment is included in at least one embodiment. Thus, discussion of the features and advantages and similar language throughout this specification may, but do not necessarily, refer to the same embodiment.

Furthermore, the described features, advantages, and characteristic may be combined in any suitable manner in one or more embodiments. One skilled in the relevant art will recognize that any embodiments may be practiced without one or more of the specific features or advantages of a particular embodiment. In other instances, additional features and advantages may be recognized in certain embodiments that may not be present in all embodiments of this disclosure.

BRIEF DESCRIPTION OF THE DRAWINGS

In order that the advantages will be readily understood, a more particular description briefly described above will be rendered by reference to specific embodiments that are illustrated in the appended drawings. Understanding that these drawings depict only different embodiments, and are not therefore to be considered to be limiting of its scope, the present disclosure will be described and explained with additional specificity and detail through the use of the accompanying drawings.

DETAILED DESCRIPTION

Figure 1:
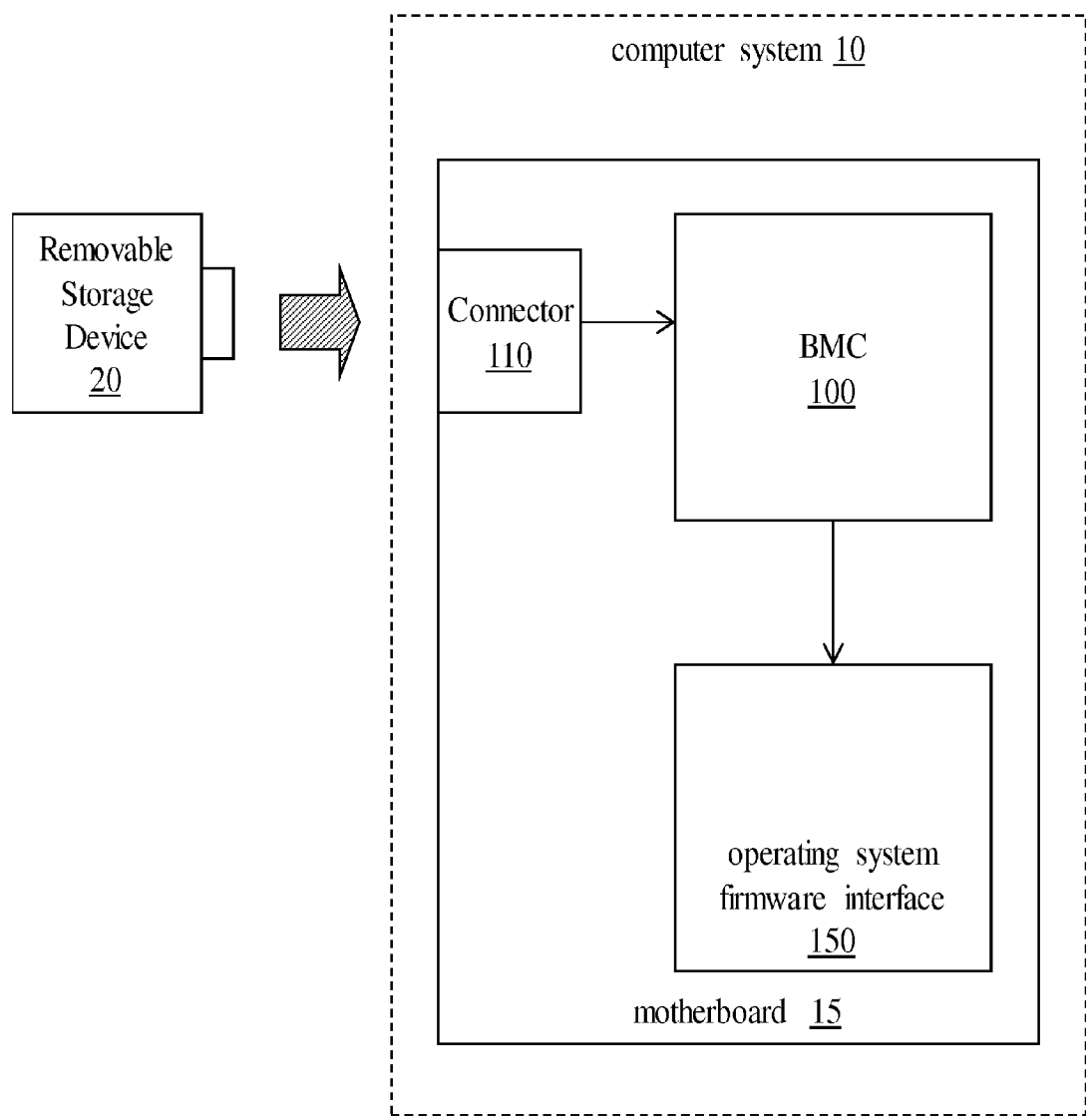
FIG. 1 is a block diagram of a computer system according to an embodiment of the present disclosure.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

As will be appreciated by one skilled in the art, the present disclosure may be embodied as a computer system, a method, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, may implement the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture, including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
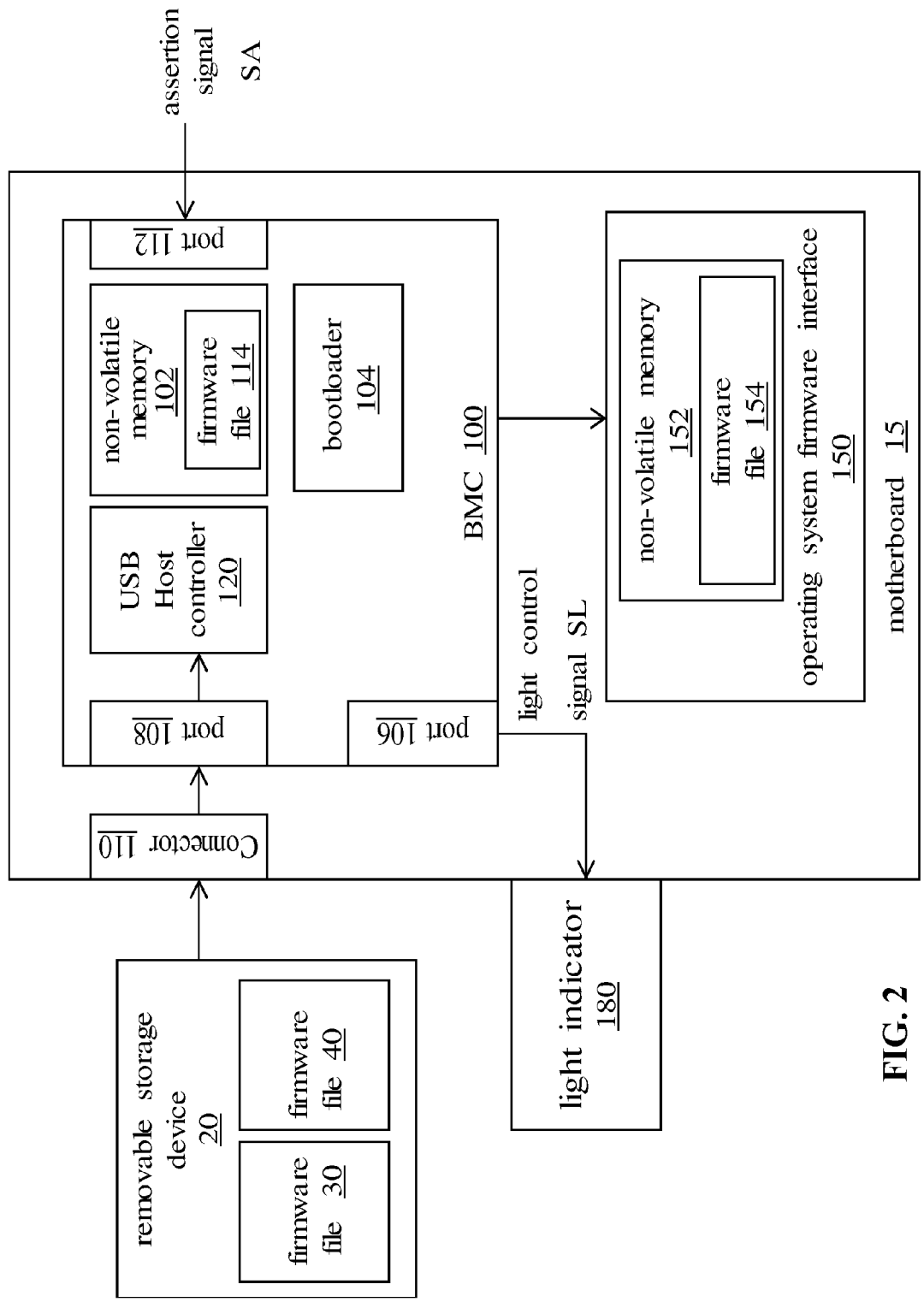
FIG. 2 is a block diagram of a motherboard according to an embodiment of the present disclosure.
Figure 3:
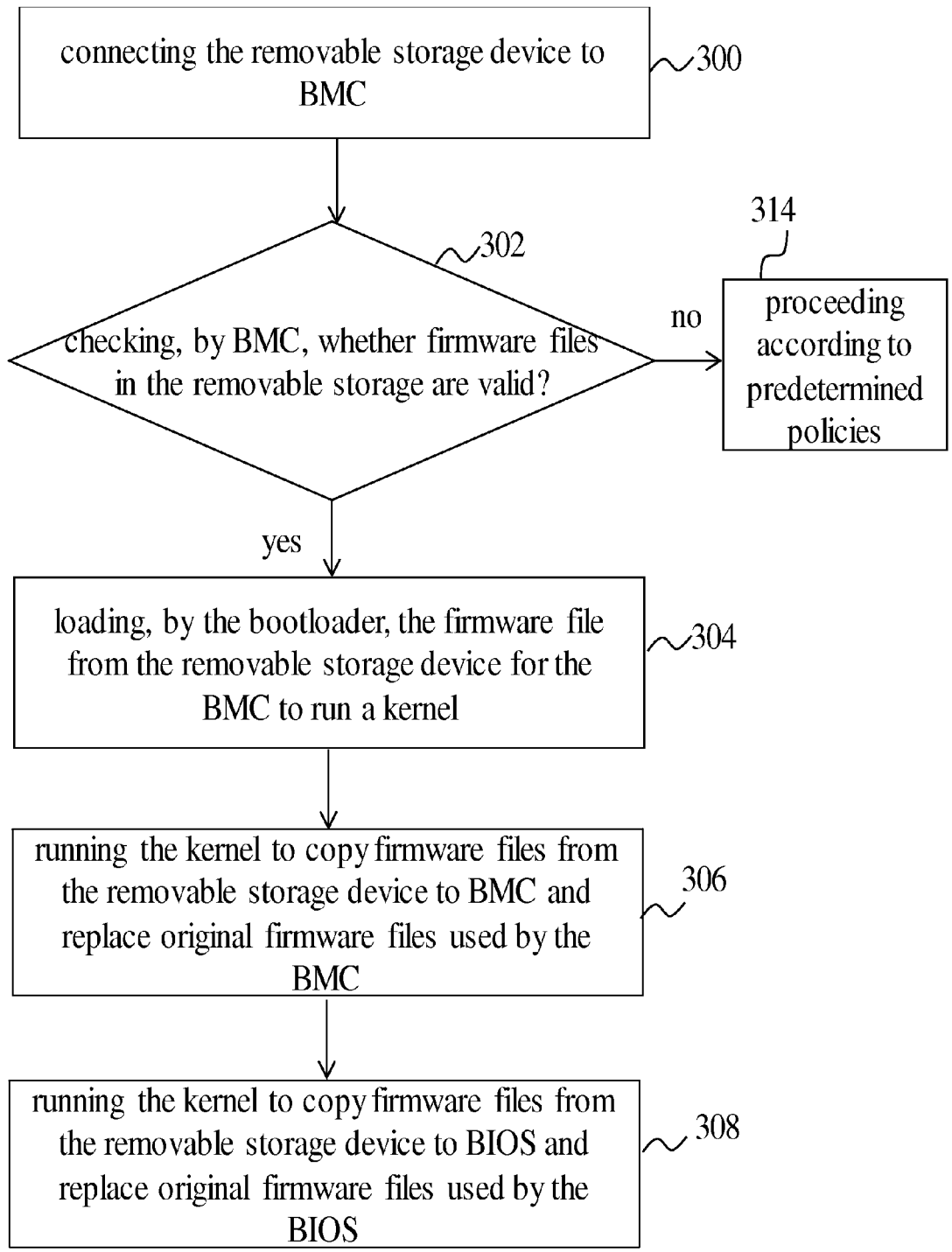
FIG. 3 is a flow chart of a method according to an embodiment of the present disclosure.

Referring now to FIG. 1 through FIG. 3, computer systems, methods, and computer program products are illustrated as structural or functional block diagrams or process flowcharts according to various embodiments of the present disclosure. The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates the hardware framework of a computer system 10 according to an embodiment of the present disclosure. The computer system 10 includes a motherboard 15, and disposed on the motherboard 15, a BMC 100, and an operating system firmware interface 150. In an example, the computer system 10 is IBM's System x 3650 M4. In another example, the BMC 100 may be IBM's IMM (Integrate Management Module). In yet another example, the operating system firmware interface 150 could be implemented as a UEFI (Universal Extensible Firmware Interface), an EFI (Extensible Firmware Interface), or a BIOS (Basic Input/Output System), but the present disclosure is not limited thereto.

The BMC 100 may be communicatively connected to the operating system firmware interface 150, and is able to write data into the operating system firmware interface 150.

As shown in FIG. 1, a connector 110 on the motherboard 15 is provided for connecting a removable storage device 20 to the BMC 100. Structures of the connector 110 match the communication protocols between the removable storage device 20 to the BMC 100, and the present disclosure is not limited thereto. For more details please refer to FIG. 2 and the descriptions that follows.

FIG. 2 illustrates an embodiment of the BMC 100 and the operating system firmware interface 150 disposed on the motherboard 15. Note that this embodiment could be applied to the computer system 10, which is at the development and testing stages. In other words, the embodiment could be implemented with only the motherboard 15 shown in FIG. 2. A complete computer system as illustrated in FIG. 1 is not always necessary for the present disclosure.

First, the BMC 100 could have a non-volatile memory 102, which stores a firmware file 114. The operating system firmware interface 150 could have a non-volatile memory 152, which stores a second firmware file 154.

As shown in FIG. 2, the connector 110 of the motherboard 15 may connect the BMC 100 via an I/O port, port 108, of the BMC 100. The port 108 could be implemented as a GPIO which is adopted in a general BMC. Alternatively, the port 108 could be implemented as a specific port exclusively provided for communication with the removable storage device 20. The removable storage device 20 may store, in advance, the firmware file 30 for the BMC 100 and the firmware file 40 for the operating system firmware interface 150.

In an embodiment, the removable storage device 20 communicates with the BMC 100 through a USB protocol. Particularly, the removable storage device 20 may operate as a USB client and the BMC 100 may be a USB host. For this purpose, the BMC 100 may have a USB host controller 120 connected to the port 108, and the BMC 100 may operate as a USB host to detect and access the removable storage device 20 as a USB client.

In an embodiment, the BMC 100 may include a bootloader 104 and another I/O port, port 112, to receive an assertion signal SA sent by a user using a switch or a jumper (both not shown) on the motherboard 15. Once the assertion signal SA is received by the BMC 100, the bootloader 104 may load the firmware file 30 from the removable storage device 20, and run a kernel (such as a Linux kernel) according to the firmware file 30.

In an embodiment, the BMC 100 may include another I/O port, port 106, to send a light control signal SL to the light indicator 180 on the motherboard 15.

The process flow of the method according to an embodiment of the present disclosure is illustrated with FIG. 3 and described below with the components illustrated in FIGS. 1 and 2.

Step 300: a user connects the removable storage device 20 to the BMC 100 through the connector 110. A USB host controller 120 of the BMC 100 may detect the removable storage device 20 and establish data communications between the BMC 100 and the removable storage device 20 according to the USB protocol.

Step 302: the user may use a switch or a jumper (both not shown) on the motherboard 15 to send an assertion signal SA to the BMC 100. In response to the assertion signal SA, the BMC 100 may first check whether the firmware file 30 and the firmware file 40 stored in the removable storage device 20 are valid. If they are valid, then the process may go to step 304 as described below. If invalid, then the process may turn to step 314, where the BMC 100 proceeds according to predetermined policies, such as sending a light control signal SL to a light indicator 180 on the motherboard 150 as a warning.

Step 304: the bootloader 104 may load the firmware file 30 for the BMC 100 from the removable storage device 20, and run a kernel according to the firmware file 30 and proceed with the following steps 306 and 308. In an embodiment, the steps 306 and 308 could be executed in parallel. In another embodiment, the step 308 could precede the step 306.

Step 306: once the BMC 100 runs the kernel, the kernel can identify the firmware file 30 in the removable storage device 20 according to headers or other file information of the firmware file 30. Then the kernel may be run to copy the firmware file 30 from the removable storage device 20 to a non-volatile memory 102 of the BMC 100, to replace the original firmware file 114 stored in the non-volatile memory 102.

Step 308: once the BMC 100 runs the kernel, the kernel can identify the firmware file 40 in the removable storage device 20 according to a header or other file information of the firmware file 40. Particularly, the kernel can further verify the firmware file 40 in the removable storage device 20. Once verified, the firmware file 40 may be copied by the BMC 100 to a non-volatile memory 152 of the operating system firmware interface 150, to replace the original firmware file 154 stored in the non-volatile memory 152.

In addition to step 314, where the BMC 100 may send a light control signal SL to the light indicator 180 of the motherboard 15, the BMC 100 in steps 304, 306, and 308, can also send different light control signals SL to the light indicator 180 to have different colors of light or to flash at different frequencies. This shows the current status to the user, which may be desirable if the computer system 10, still at the development or testing states, is unable to be booted up at this moment and if the computer system 10 is not provided with a display device (not shown), or it fails to drive the display device.

The foregoing embodiments are provided to illustrate and disclose the technical features of the present disclosure, and are not intended to be restrictive of scope. Hence, all equivalent variations or modifications made to the foregoing embodiments without departing from the spirit embodied in the present disclosure should fall within the scope of the present disclosure as set forth in the appended claims.

What is claimed is:

1. A method of firmware loading on a motherboard, comprising:
   connecting, via a connector, a removable storage device to an interface, wherein the removable storage device has a first firmware file, a second firmware file, and a pre-stored kernel, wherein the interface is connected to a baseboard management controller (BMC);
   loading, by a bootloader, the kernel from the removable storage device;
   running the kernel, by the bootloader, the running of the kernel including:
      copying the first firmware file from the removable storage device to a first non-volatile memory, the first non-volatile memory within the BMC; and
      copying the second firmware file from the removable storage device to a second non-volatile memory, the second non-volatile memory within an operating system interface, the operating system interface being communicatively coupled to the BMC.

2. The method of claim 1, further comprising receiving an input signal sent by a user using a switch on a motherboard, wherein the bootloader is configured to load the first firmware file from the removable storage device in response to the user input signal.

3. The method of claim 1, further comprising transmitting a light control signal to a light indicator when the bootloader is loading or copying the first firmware file.

4. The method of claim 1, wherein the loading of the kernel does not require network support or system boot up.

5. The method of claim 1, wherein the removable storage device is physically connectable to the interface by a user.

6. A system for loading firmware, the system comprising:
a computer system;
a motherboard within the computer system;
a Baseboard Management Controller (BMC) disposed on the motherboard;
a connector on the motherboard to connect the BMC via an I/O port of the BMC;
a USB host controller connected to the I/O port;
a removable storage device connectable to the BMC via the connector on the motherboard, the removable storage device having a pre-stored first firmware file and a kernel;
a bootloader disposed on the BMC, wherein the bootloader is configured to load the kernel from the removable storage device and to run the kernel, the kernel being configured to copy the first firmware file from the removable storage device;
an operating system firmware interface communicatively coupled to the BMC, the operating system firmware interface configured to receive the first firmware file as a replacement of a second firmware file stored in non-volatile memory within the operating system firmware interface; and
a light indicator configured to receive a light control signal when the bootloader is loading the kernel.

* * * * *